United States Patent [19]
Desai et al.

[11] Patent Number: 5,940,493
[45] Date of Patent: Aug. 17, 1999

[54] SYSTEM AND METHOD FOR PROVIDING DIRECTORY ASSISTANCE INFORMATION

[75] Inventors: Nailesh B. Desai; Prasad V. Nimmagadda, both of Norcross, Ga.

[73] Assignee: BellSouth Corporation, Atlanta, Ga.

[21] Appl. No.: 08/756,442

[22] Filed: Nov. 26, 1996

[51] Int. Cl.[6] .................................................. H04M 3/52
[52] U.S. Cl. ........................ 379/260; 379/142; 379/201; 379/223
[58] Field of Search .................................... 379/201, 207, 379/229, 230, 222, 223, 228, 260, 261, 265, 267, 142, 213, 214

[56] References Cited

U.S. PATENT DOCUMENTS

| | | | |
|---|---|---|---|
| 4,677,609 | 6/1987 | Piereth et al. | 379/260 |
| 4,918,719 | 4/1990 | Daudelin | 379/214 |
| 4,930,154 | 5/1990 | Bauer et al. | 379/260 |
| 5,012,512 | 4/1991 | Basso et al. | 379/260 |
| 5,157,718 | 10/1992 | Kaplan et al. | 379/223 |
| 5,210,789 | 5/1993 | Jeffus et al. | 379/223 |
| 5,239,577 | 8/1993 | Bates et al. | 379/201 |
| 5,450,476 | 9/1995 | D'Apuzzo et al. | 379/212 |
| 5,483,586 | 1/1996 | Sussman | 379/201 |
| 5,488,652 | 1/1996 | Bielby et al. | 379/142 |
| 5,509,058 | 4/1996 | Sestak et al. | 379/201 |
| 5,555,290 | 9/1996 | McLeod et al. | 379/207 |
| 5,570,417 | 10/1996 | Byers | 379/220 |
| 5,594,784 | 1/1997 | Velius | 379/216 |
| 5,613,006 | 3/1997 | Reese | 379/142 |
| 5,638,425 | 6/1997 | Meador, III et al. | 379/201 |
| 5,638,430 | 6/1997 | Hogan et al. | 379/112 |
| 5,661,792 | 8/1997 | Akinpelu et al. | 379/207 |
| 5,675,637 | 10/1997 | Szlam et al. | 379/201 |
| 5,684,866 | 11/1997 | Florindi et al. | 379/229 |
| 5,696,816 | 12/1997 | Sonnenberg | 379/207 |
| 5,699,416 | 12/1997 | Atkins | 379/207 |
| 5,727,057 | 3/1998 | Emery et al. | 379/211 |
| 5,740,239 | 4/1998 | Bhagat et al. | 379/207 |
| 5,764,745 | 6/1998 | Chan et al. | 379/220 |
| 5,799,072 | 8/1998 | Vulcan et al. | 379/114 |
| 5,862,203 | 1/1999 | Wulkan et al. | 379/114 |

FOREIGN PATENT DOCUMENTS 0 710 042 A2   5/1996   European Pat. Off. .

OTHER PUBLICATIONS

"Directory Assistance System," British Telecommunications Engineering, vol. 5, Part 4, Jan. 1987, UK, pp. 294–295.

"ITT Communications and Information Services Inc.," Electrical Communication, 1983, UK, vol. 58, No. 1, ISSN 0013–4252, pp. 83–87.

M. Fournier et al., "Résultats d'exploitation du concentrateur de terminaux d'annuaire" Commutation & Transmission, vol. 8, No. 1, 1986, Paris, Fr. pp. 51–60.

Translation of M. Fournier et al., "Résultats d'exploitation du concentrateur de terminaux d'annuaire" Commutation & Transmission, vol. 8, No. 1, 1986, Paris, Fr, pp. 51–60.

Primary Examiner—Scott Wolinsky
Attorney, Agent, or Firm—Jones & Askew, LLP

[57] ABSTRACT

A system and method for providing directory assistance service and information in a multiple service provider and a local number portability environment. An operator services system (OPSS) (15) is functionally connected to a first and a second database (24, 26). Preferably, the first database (24) is a directory assistance database, and the second database (26) is a directory assistance-local number portability (DA-LNP) database. Upon receipt of a request for a directory number associated with the name of a party, the OPSS (15) makes a first query of the first database (24) for first search results relating to the name of the party. Preferably, the OPSS (15) also concurrently makes a second query, but of the second database (26) for second search results relating to the name of the party. The first and second databases are searched based on the name of the party. The first and second search results are provided to the OPSS (15). In response to receipt of the first and second search results, the OPSS (15) consolidates both search results into consolidated search results. Preferably, the OPSS (15) eliminates any duplicative entry between the first and second search results. The OPSS (15) then provides the consolidated search results to a display (21). The consolidated search results are displayed and are used to provide the directory assistance service in response to the request for the name of the party.

16 Claims, 3 Drawing Sheets

SYSTEM AND METHOD FOR PROVIDING DIRECTORY ASSISTANCE INFORMATION

TECHNICAL FIELD

The present invention generally relates to the field of telecommunications, and particularly relates to a system and method for providing directory assistance information in a multiple local service provider environment and a local number portability environment.

BACKGROUND OF THE INVENTION

Prior to recent telecommunications legislation, subscribers located within a particular geographic area were served only by a particular local telecommunications service provider. There was virtually no choice regarding the delivery of local telecommunication services. One of the telecommunication services that was provided by the location telecommunications service provider was directory assistance (DA). Typically, directory assistance services were provided with respect to the directory numbers of the subscribers within the particular geographic area served by the service provider. To provide directory assistance, the service provider for the area generally maintained a single comprehensive directory assistance database. This database generally included an entry containing specified information for each subscriber within the geographic area. For example, an entry for John Doe would have included his name, address and directory number. In response to a request for John Doe's directory number, the directory assistance database provided John Doe's directory number based on the input of John Doe's name, and possibly his address or locality. The same retrieval process obtained the directory number of any other subscriber within the particular area served by the service provider unless the subscriber held an unlisted directory number (or possibly for other reasons irrelevant to the present application). Thus, the service provider for a particular geographic area provided directory assistance services with respect to directory numbers of subscribers within the geographic area served by the service provider through the use of a single comprehensive directory assistance database.

Recent telecommunications legislation has made it possible for multiple service providers to offer telecommunication services to the same group of subscribers located within a particular geographic area. This incursion of competitive service providers disturbs the offering of directory assistance services based on a single comprehensive directory assistance database. This disturbance results from the fragmentation of the group of telecommunication service subscribers within a particular geographic area into sub-groups based on the service provider to which each sub-group subscribes for services. The fragmentation into sub-groups does not readily allow for a single comprehensive directory assistance database for all subscribers within the particular geographic area. For example, consider a group of 100,000 subscribers who received telecommunication services from Service Provider A prior to local competition for telecommunication services. Service Provider A provided directory assistance services through the maintenance of a single comprehensive directory assistance database for the 100,000 subscribers of this group.

With local service competition, as an example, this group of subscribers may be divided into three sub-groups including: sub-group A of 20,000 subscribers who receive telecommunication services from Service Provider A; sub-group B of 30,000 subscribers who receive telecommunication services from Service Provider B; and sub-group C of 50,000 subscribers who receive telecommunication services from Service Provider C. If each of the Service Providers A, B and C were to provide directory assistance services with respect to its subscribers, then each would have to maintain a directory assistance database including entries related to its own subscribers. On the other hand, the Service Providers A, B or C might cooperate by agreements with one or both of the other service providers so that one of these service providers maintained a more comprehensive directory assistance database with respect to the subscribers of the other service providers that were party to the agreements. Whether a service provider decides to maintain its own directory assistance database or whether a service provider decides to cooperate with the other service providers in the geographic area, problems arise in the delivery of directory assistance services under such multiple service provider conditions as is explained below.

A set of problems related to directory assistance services in the local competitive environment is faced by a calling party who seeks directory assistance. Whom does the calling party call for directory assistance? This question may be answered by legislation that designates that a particular service provider (or group thereof) provide comprehensive directory assistance services for the geographic area. If there is no comprehensive directory assistance for a particular area, then a calling party may have to call in series the directory assistance service of each of the service providers serving the area until the calling party obtains the desired information or the calling party gives up. As a result, the calling party's perceived value of directory assistance services is diminished. This diminishment stems from the calling party's perception that not much assistance and therefore not much value is obtained from such directory assistance services. If a calling party does not believe that much value is derived from directory assistance service, then the calling party may refrain from using such services or use them only sparingly. Thus, the income to service providers derived from directory assistance services may be reduced.

To avoid a diminishment in the perceived value of directory assistance services, a service provider may opt to provide a calling party with as much assistance as possible in obtaining the directory number of a party. For example, if the directory assistance database of the service provider does not include an entry for a particular party, then the service provider may provide one or more of the following services: (1) the service provider may route the call to the appropriate service provider; (2) the service provider may offer information to the calling party as to which other service provider may have an entry for the particular party; or (3) that service provider may offer other information to the calling party. In this manner, the calling party is made to feel like service is being provided. The calling party does not have to follow a hit-or-miss approach to obtaining the directory number of a particular party. Nonetheless, a service provider desiring to provide as much assistance as possible to a calling party who seeks the directory number of a party faces significant problems. The service provider may not have information as to which service provider other than itself provides any particular party with telecommunications service. Even if a service provider were to keep such information in a directory assistance database or elsewhere, such information may not be current or may be inaccurate. Thus, it may be difficult for a service provider to provide assistance to a calling party who seeks the directory number of a party who does not receive telecommunications service from that service provider.

In sum, the general problem is to provide comprehensive directory assistance services in a multiple service provider local environment. In this context, a specific problem is to provide directory assistance services where there is no single comprehensive directory assistance database. Another specific problem is to provide directory assistance services in the multiple service provider local environment without altering significantly the procedures and form of the directory assistance services that are in place. Yet another specific problem is to provide directory assistance services to calling parties in such a manner that the perceived value of the directory assistance services is undiminished. In addition, a specific problem is to provide directory assistance services in such a manner that a calling party is provided with useful information with respect to obtaining further assistance when the directory assistance service does not include an entry for the party whose directory number the calling party is seeking.

Therefore, there is a need for a system that provides directory assistance services in a multiple service provider local environment.

There is a particular need for a system that provides directory assistance services to take into account the separate databases that may be maintained by the service providers serving the geographic area.

There is also a need for a system that provides directory assistance services in a manner that works with existing directory assistance services and directory assistance databases.

There is a further need for a system that provides directory assistance services to calling parties in a manner such that the perceived value of directory assistance services is not diminished.

There is an additional need for a system that provides directory assistance services in such a manner that a calling party is provided with useful information.

SUMMARY OF THE INVENTION

The present invention satisfies the problems and needs discussed in the background section by providing an improved system and method for providing directory assistance service and information in a multiple service provider local environment, and in particular, in a local number portability environment. Generally stated, the present invention provides a telecommunications system that includes an operator services system (OPSS) functionally connected to a first database and a second database. The first database includes one or more first database entries with each first database entry including a name and directory assistance information. The second database includes one or more second database entries with each second database entry including a name and directory assistance information. Preferably, the first database is a directory assistance database, and the second database is a directory assistance-local number portability (DA-LNP) database. The OPSS may be functionally connected to a plurality of DA-LNP databases and to a plurality of directory assistance databases.

Upon receipt of a request for a directory number associated with the name of a party, the OPSS makes a first query of the first database for first search results relating to the name of the party. The OPSS also makes a second query, but of the second database for second search results relating to the name of the party. Preferably, the OPSS concurrently queries the first and second databases. The first database searches the first database entries for the name of the party and provides the first search results to the OPSS. The second database searches the second database entries for the name of the party and provides the second search results to the OPSS. Preferably, the second search results include an entry corresponding to the directory number associated with name of the party, and the entry includes a service provider identification. In response to receipt of the first search results and the second search results, the OPSS consolidates the first search results and the second search results into consolidated search results. Preferably, the OPSS consolidates the first search results and the second search results by eliminating any duplicative entry between the first search results and the second search results. The OPSS then provides the consolidated search results to a display. The consolidated search results are displayed and are used to provide the directory assistance service in response to the request for the directory number associated with the name of the party.

An alternate embodiment of the present invention also provides a telecommunications system for providing directory assistance information to a calling party who has requested the directory number of a party. This alternate embodiment includes a directory assistance-local number portability (DA-LNP) database having one or more entries with each entry further including a name and directory assistance information. This alternate embodiment also includes an operator services system (OPSS) that receives a request from the calling party for a directory number of a party, and makes a query of the DA-LNP database with respect to the request based on the name of the party. In response to the query from the OPSS, the DA-LNP database checks the one or more entries for a matching entry to the party based on the name of the party. If the matching entry is found, the DA-LNP database provides the OPSS with the directory assistance information corresponding to the matching entry. Preferably, the directory assistance information corresponding to the matching entry further includes a service provider identification corresponding to the directory number of the party. The OPSS then receives the directory assistance information corresponding to the matching entry from the DA-LNP database. Preferably, the switch provides the directory assistance information corresponding to the matching entry to a display, which then displays the directory assistance information corresponding to the matching entry.

The present invention also provides preferred methods of operation for providing directory assistance service. Pursuant to a preferred method, a request for a directory number associated with the name of a party is received. In response to the request and using the name, a first database is searched for first search results relating to the name of the party. Also in response to the request and using the name, a second database is searched for second search results relating to the name of the party. Preferably, the second search results include a service provider identification relating to the name of the party, and the second database is searched for the service provider identification. In addition, it is preferred that the first database and the second database are searched concurrently. Also, it is preferred that the first search results and the second search results are consolidated into consolidated search results. This consolidation preferably occurs by eliminating any duplicative entry between the first search results and the second search results. The consolidated search results then are displayed Preferably, the calling party is provided with the directory assistance service based on the consolidated search results.

The present invention provides an alternate method for providing directory assistance information to a calling party who has requested the directory number of a party. Pursuant to this alternate method, a directory assistance-local number portability (DA-LNP) database is provided. The DA-LNP database includes one or more entries with each entry further including a name and a service provider identification. Per this method, the name of the party is used to search the DA-LNP database for a service provider identification relating to the name of the party. The service provider identification relating to the name of the party then is used to provide the directory assistance information.

While the preferred embodiment of the present invention is disclosed in the context of a directory assistance service, those skilled in the art will appreciate that the principles of the present invention may be applied to virtually any type of information delivery service which consults information sources and provides information to a requesting party or entity.

Advantageously, the present invention provides directory assistance services in a multiple service provider local environment, and in a local number portability environment. The present invention preferably provides directory assistance services with respect to the directory number of a party or information with respect to that party in an environment where there may be no single comprehensive directory assistance database. In particular, the present invention provides directory assistance services in such a manner that the service provider may provide the requested directory number, or the service provider may route the call to the appropriate service provider for the provision of the requested directory number. Alternatively, the calling party may be provided with other information related to the requests for the directory number of a party. Further, the present invention provides directory assistance services to calling parties in such a manner that the perceived value of the directory assistance services is not diminished. In addition, the present invention provides directory assistance services in a multiple service provider local environment without altering significantly the procedures and form of the directory assistance services that are already in place.

Therefore, it is an object of the present invention to provide an improved system and method for providing directory assistance service and information, and in particular, to provide a system and method for providing directory assistance service and information in a multiple local service provider environment and a local number portability environment.

It is also an object of the present invention to provide an improved system and method for providing directory assistance services in a manner that works with existing directory assistance services and directory assistance databases.

It is an additional object of the present invention to provide an improved system and method for providing directory assistance services to calling parties in a manner such that the perceived value of directory assistance services is not diminished.

It is yet another object of the present invention to provide an improved system and method for providing directory assistance services in such a manner that a calling party is provided with useful information.

That the present invention and the preferred embodiments thereof overcome the drawbacks set forth above and accomplish the objects of the invention set forth herein will become apparent from the detailed description of the preferred embodiments that follow below.

DETAILED DESCRIPTION

Figure 1:
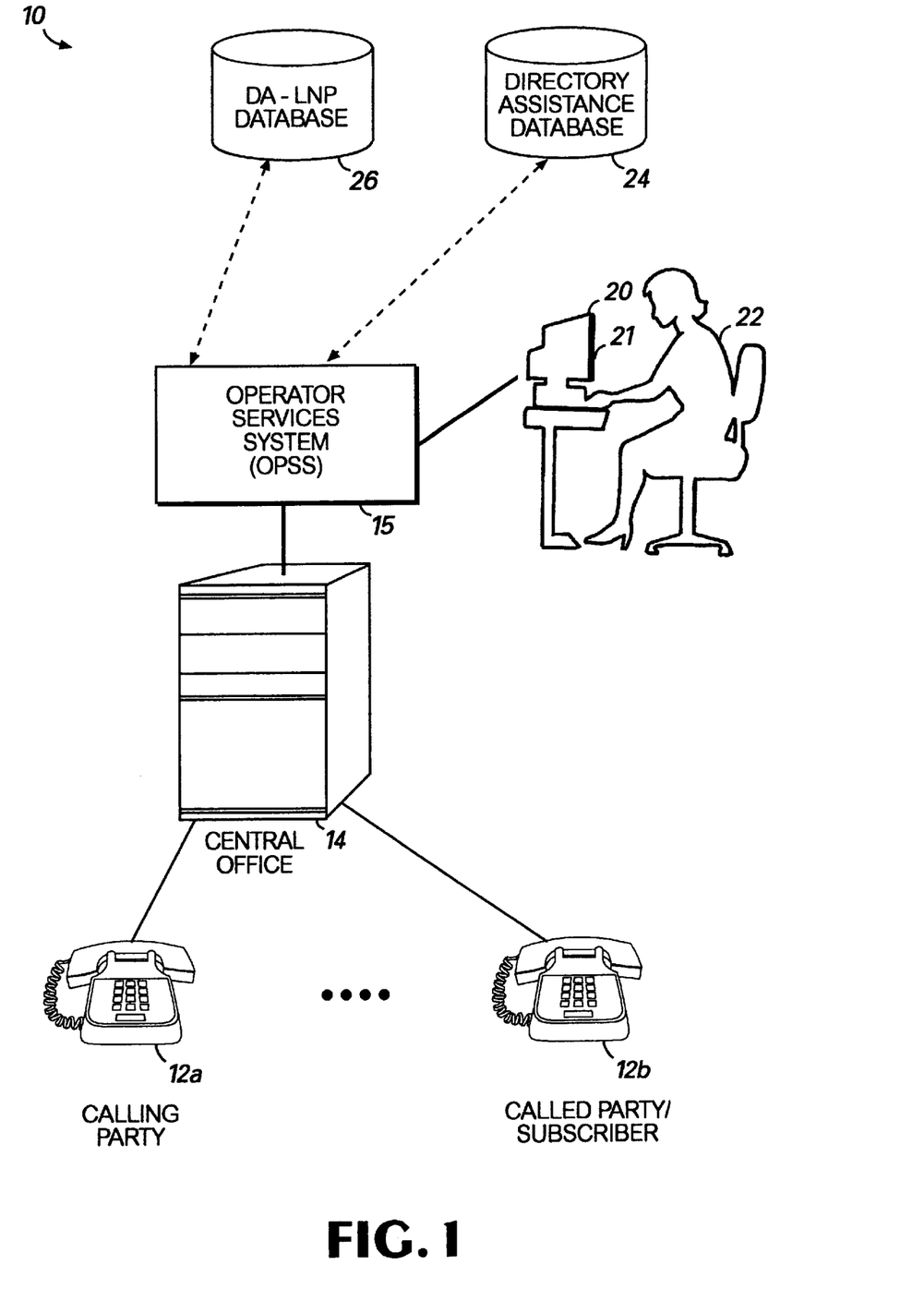
FIG. 1 illustrates elements of the preferred environment for the preferred embodiments of the present invention.
Figure 2:
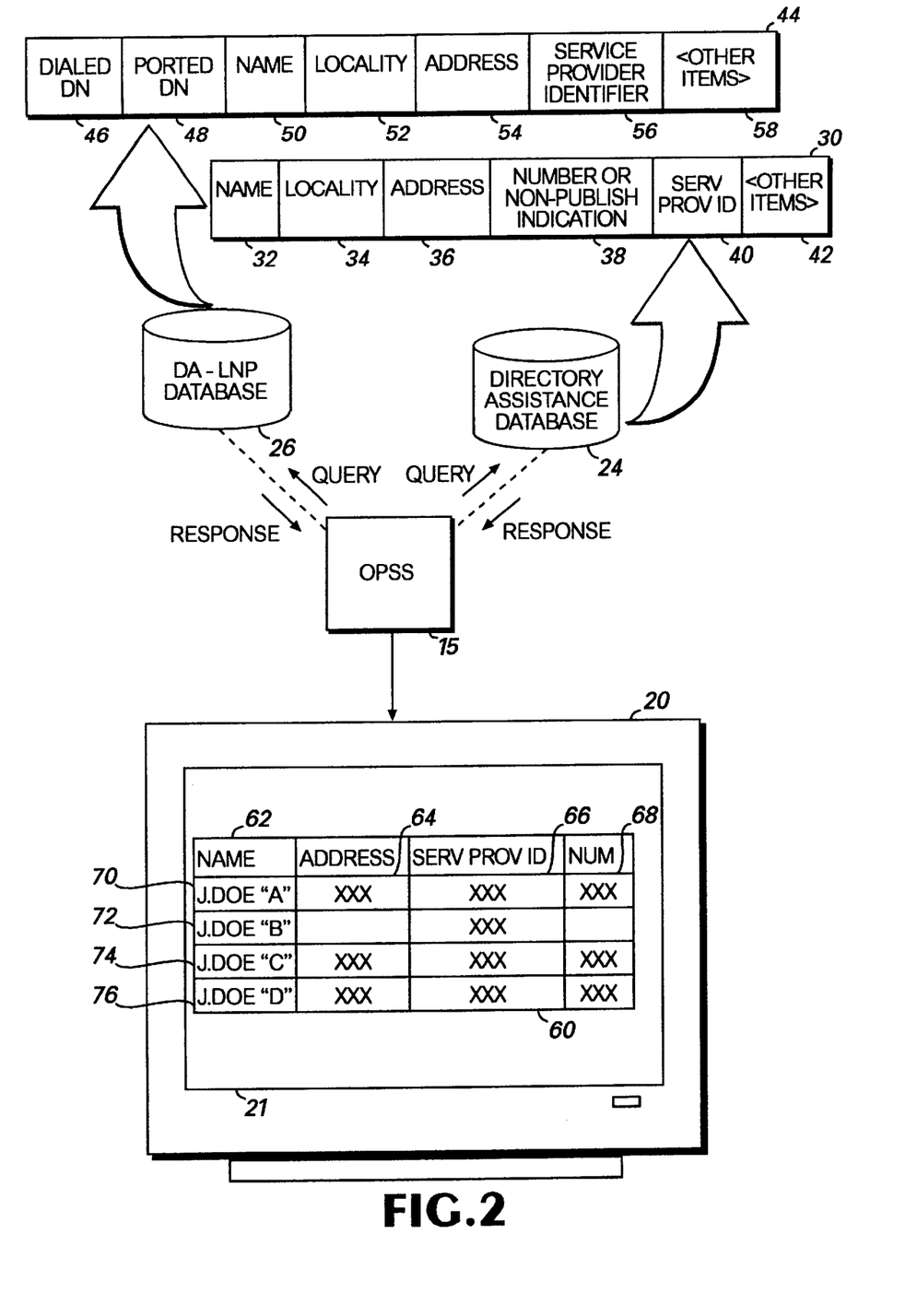
FIG. 2 illustrates additional details regarding the directory assistance database and the local number portability database used in connection with the preferred embodiment of the present invention.
Figure 3:
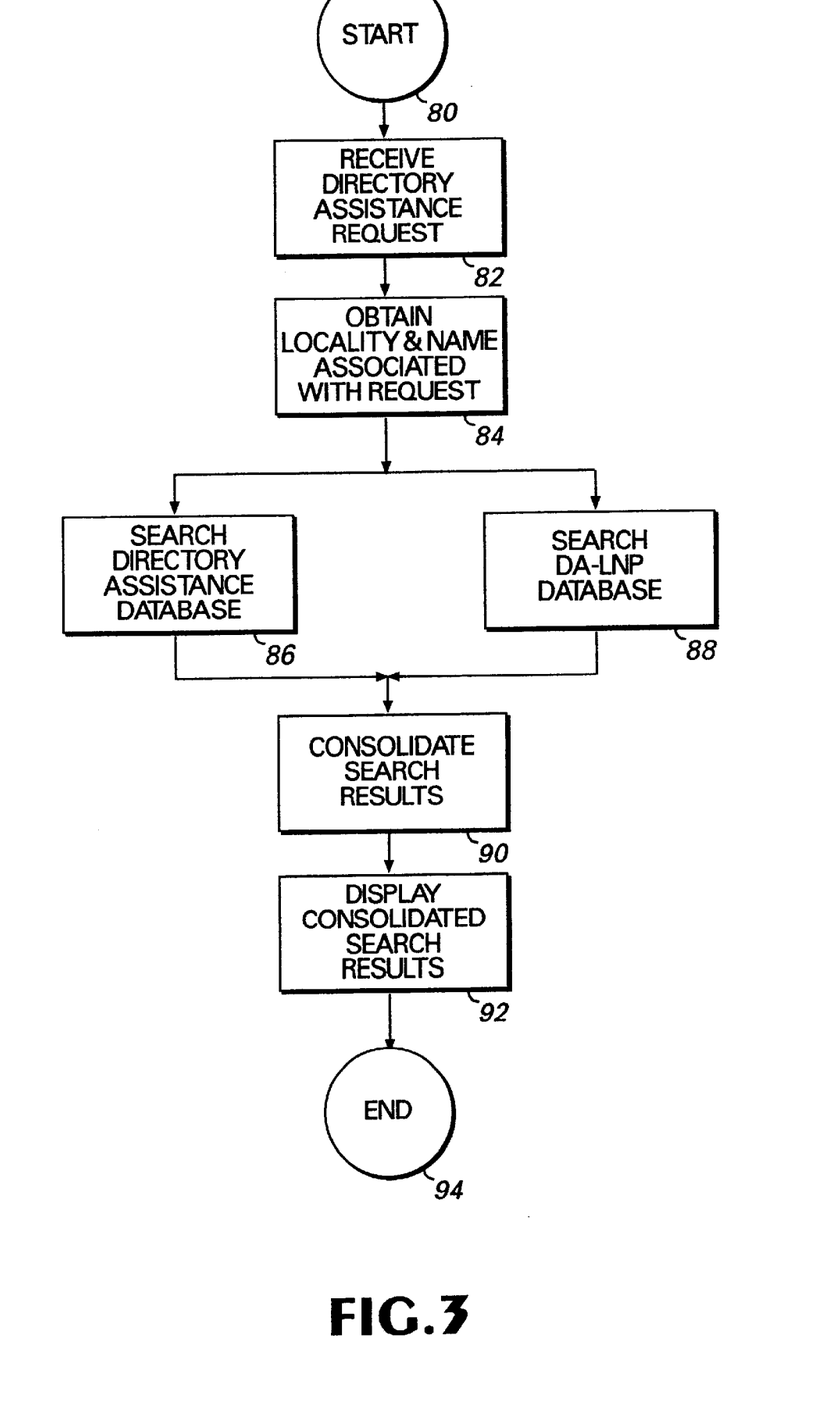
FIG. 3 is a flow chart illustrating the steps of the preferred method of the present invention.

In this detailed description, an overview of the preferred embodiment is first presented. Then, the preferred embodiment is described with respect to the preferred environment including elements of the public switched telephone network (FIG. 1). Further details of the preferred embodiment are provided with regard to the preferred directory assistance database and the preferred directory assistance-local number portability (DA-LNP) database (FIG. 2). This detailed description concludes with a flow chart illustrating the steps of the preferred method (FIG. 3).

Overview of the Preferred Embodiment

The preferred embodiment of the present invention is a system and method for providing directory assistance information. The preferred embodiment is disclosed below in the context of a service provider that provides directory assistance services in a multiple service provider local environment, and in particular, in a local number portability environment. Those skilled in the art will appreciate that the principles of the preferred embodiment may be applied so as to provide alternate directory assistance services based on the principles described herein.

Broadly stated, the preferred embodiment operates in response to the receipt at an operator services system (OPSS) of a request from a calling party for the directory number of a party. In response, the OPSS checks two databases for directory assistance information: a directory assistance database and a directory assistance-local number portability (DA-LNP) database. Preferably, the OPSS uses the name of the party whose directory number had been requested to check each of the databases. Each database searches for any matching entries to the name provided by the OPSS. After the search is carried out, each database provides the respective search results to the OPSS. The search results may be a null set. On the other hand, if there is one or more matching entries, each database provides the search results including the one or more matching entries to the OPSS. Upon receipt of the search results from each database, the switch consolidates the search results into consolidated search results by eliminating duplicate entries. The consolidated search results then preferably are provided by the OPSS to a display operated by a directory assistance operator. From the display of the consolidated search results, the operator provides the calling party with directory assistance information relating to the party whose directory number the calling party requested. The consolidated search results may include an entry including the directory number of the party whose directory number had been requested and/or may include the service provider identification of the service provider that provides the party with telecommunication service.

The Preferred Environment of the Preferred Embodiment

The preferred environment of the present invention is the public switched telephone network (PSTN) in a multiple service provider and local number portability environment. Additional information regarding the PSTN and Advanced Intelligent Network (AIN) elements thereof may be derived from the disclosure in the commonly assigned patent to Weisser, U.S. Pat. No. 5,430,719, which is incorporated herein by reference.

FIG. 1 illustrates elements of the preferred environment for the preferred embodiments of the present invention. In particular, FIG. 1 illustrates the preferred telecommunications system 10 for the provision of directory assistance service by a service provider. Representative terminating equipment 12a, 12b is illustrated as connected to a central office 14. Although telephones are illustrated as the pieces of terminating equipment, those skilled in the art will understand that such pieces include other telecommunication units or devices such as facsimile machines, computers, modems, etc. One of the illustrated telephones 12a is designated as corresponding to the calling party. The term "calling party" is used herein generally to refer to the person or device that initiates a communication. The calling party may also be referred to herein as "caller" or as "source". In some cases, the calling party may not be a person, but may be a device such as a telecommunications device including a facsimile machine, answering service, modem, etc. Another of the illustrated telephones 12b is designated as corresponding to the called party or subscriber. The term "called party" is used herein generally to refer to the person or device that answers or responds to the call or communication. The term "subscriber" is also used synonymously herein to refer to the "called party" unless a difference is noted. Of course, the called party need not necessarily be the subscriber of a service, nor the party nor device whom the caller is trying to reach.

The terminating equipment 12a, 12b is illustrated as connected by respective subscriber lines to central office 14. Typically, each subscriber line is assigned a directory number, which is also referred to as a telephone number. In the United States, a directory number has ten digits (NPA-NXX-XXXX) including a three digit area code (NPA) followed by a three digit exchange code (NXX). As is referenced below, the three digit area code plus three digit exchange code (referred to herein as "NPA-NXX") figure prominently in the implementation of the local number portability environment in the public switched telephone network.

As noted, each subscriber line is connected to a central office 14. Central office 14 is interconnected to other central offices by a plurality of trunk circuits (not shown). These trunk circuits are the voice path trunks that interconnect the central office switches to connect communications. The term "communication" is used herein to include all messages or calls that may be exchanged between a calling party and a called party in the system illustrated in FIG. 1 including voice, data and video messages. The term "communication" is used synonymously herein with the term "call" unless a distinction is noted.

As illustrated, central office 14 is connected via voice and data paths to an operator services system (OPSS) 15 which typically includes one or more elements that serve as part of the infrastructure generally used by a service provider in the provision of directory assistance services. An OPSS generally includes at least two functions: a switching function and a processing function. In the preferred embodiment, the OPSS 15 comprises an access tandem switch and a toll operator position system (TOPS) manufactured by Nortel (Northern Telecom), 2221 Lakeside Boulevard, Richardson, Tex. 75082. An alternative to TOPS is the operator service position system (OSPS) manufactured by Lucent Technologies, Inc. Although OPSS 15 is illustrated as a separate element in FIG. 1, those skilled in the art will understand that OPSS or the OPSS functionality may be included as part of central office 14 or other network element with the appropriate functional connections. In the preferred embodiment, requests for directory assistance information are routed from a calling party 12a through a central office 14 via voice and data paths. The OPSS 15 is typically functionally connected to one or more computer terminals such as computer terminal 20 including display 21. The computer terminals are generally staffed by directory assistance operators such as directory assistance operator 22. The OPSS 15 also is functionally connected to a directory assistance database 24 and to a directory assistance-local number portability (DA-LNP) database 26. In the preferred embodiment, the directory assistance database 24 is connected to the OPSS 15 via a datalink, and the local number portability database 26 is connected to the TOPS switch via a datalink or signaling link. Although FIG. 1 illustrates only two databases 24, 26, it will be appreciated that the OPSS 15 may be connected directly or functionally to other databases as well. For example, the OPSS 15 may be connected to additional directory assistance databases similar to directory assistance database 24, or to additional DA-LNP databases such as an DA-LNP database 26. Of course, the elements illustrated in FIG. 1 may be connected to other network elements as appropriate.

Pursuant to the preferred embodiment, a calling party typically may initiate a request for local directory assistance information by picking up the handset of a piece of terminating equipment such as 12a and by dialing a number designated for directory assistance information such as "411". This "411" information is received at the central office 14 serving the terminating equipment 12a and is recognized as a request for directory assistance. The request is forwarded in a conventional manner through the OPSS 15 to the computer terminal 20 of an available operator 22. Generally, the calling party is asked to identify the name of the party whose directory number is being requested and to identify the party's locality. With this name and locality information, the operator 22 preferably concurrently makes a query to each of the two databases 24, 26 to which the computer terminal 20 of the operator 22 is functionally connected through the OPSS. If the computer terminal 20 is functionally connected to more than just the two databases 24, 26, the query is concurrently made to each of the other databases as well. The detailed description of the preferred embodiment hereinafter refers only to directory assistance database 24 and DA-LNP database 26 for simplicity of explanation. But it will be understood that a plurality of databases of each type may be present. The query to each database includes the name and/or locality information provided by the calling party.

As is described in greater detail below in connection with FIG. 2, each of the databases 24, 26 responds to the query by a search for a matching entry to the name and/or locality information. This search may result in the null set, i.e., no matching entry, or may result in one or more matching entries. Each of the search results from the respective databases 24, 26 is provided to the OPSS 15. The search results from each of the databases 24, 26 are consolidated into consolidated search results by the deletion of any duplicate entries between the two sets of search results. The consolidated search results are then provided to the appropriate computer terminal 20 for presentation on the display 21. The directory assistance operator 22 uses the consolidated search results on the display 21 to provide directory assistance information to the calling party.

The general system and operation of the preferred embodiments of the present invention have been presented above in connection with the preferred environmental elements as illustrated in FIG. 1. The following paragraphs present a description of the use of the two databases, directory assistance database 24 and DA-LNP database 26, in a local number portability environment.

Directory Assistance Database

FIG. 2 illustrates additional details regarding the directory assistance database 24 and the DA-LNP database 26 used in connection with the preferred embodiment of the present invention. As used in the preferred embodiment, the directory assistance database 24 is similar to conventional directory assistance databases. The directory assistance database 24 includes an entry for each subscriber of the service provider which provides the directory assistance services associated with that directory assistance database. Of course, by agreement with other service providers, the directory assistance database may include entries corresponding to subscribers of other service providers. Each entry preferably includes directory assistance information such as the name of the subscriber, directory number of the subscriber, etc. The difference between the directory assistance database 24 of the preferred embodiment and conventional directory assistance databases is that the directory assistance database 24 of the preferred embodiment includes additional directory assistance information with each entry. In particular, the directory assistance database 24 includes a service provider identifier for the service provider that serves the subscriber associated with the entry. A service provider identifier may also be referred to as service provider identification or service provider ID. Reference is made to FIG. 2 which illustrates an exemplary entry 30 including blocks 32, 34, 36, 38, 40, and 42 corresponding to types of information that may be stored in connection with the entry 30. In particular, entry 30 preferably includes the following information: the name of the subscriber 32; the locality of the subscriber 34; the address of the subscriber 36; the directory number of the subscriber or a non-publish indication 38; a service provider identifier 40; and possibly other information 42. The inclusion of additional directory assistance information such as the service provider identifier 40 in an entry so that the service provider identifier is associated with the name of a particular subscriber may be accomplished in a manner well known to those skilled in the art.

Local Number Portability Environment

As noted above in the background, recent legislation has allowed for competition, and therefore, for multiple service providers in a local telecommunications market. One aspect of the recent telecommunications legislation requires a local number portability environment. In such an environment, a subscriber to telecommunications service may retain a particular directory number even if the subscriber changes service providers. Thus, in a local portability environment, John Doe retains his directory number of 404-818-3700 when John Doe changes his telecommunications subscription from Service Provider A (which originally assigned the directory number) to Service Provider B.

Previous to local number portability, the NPA-NXX of a dialed directory number was used to route the communication along to the central office that serves the terminating equipment associated with the dialed directory number. In the multiple local service provider and local number portability environment, the telecommunications system faces a challenge in the appropriate routing of a communication based on the status of the called party as a subscriber to one of a plurality of service providers in the local area. In particular, each central office in the public switched telephone network must be able to appropriately further route a communication along to the terminating equipment associated with a dialed directory number. In a local number portability environment, the NPA-NXX of a dialed directory number associated with a communication may not provide accurate routing information with respect to the communication. The NPA-NXX may not provide accurate routing information because the switch currently serving the dialed directory number may be a different switch from the switch that originally served the dialed directory number prior to the subscriber's change to a different service provider. Thus, each switch must have access to information other than just the NPA-NXX of a dialed directory number for use in routing a communication. One type of local number portability implementation provides that each central office have access to a local number portability database for use in routing a communication.

Directory Assistance-Local Number Portability (DA-LNP) Database

The present invention preferably provides that an OPSS 15 used in directory assistance service have access to a directory assistance-location number portability (DA-LNP) database for use in directory assistance services. A DA-LNP database 26 is illustrated in FIG. 1 as connected to OPSS 15. Generally, the DA-LNP database 26 includes entries corresponding to directory numbers that have been "ported". A "ported directory number" is a directory number whose associated subscriber has changed service providers and the NPA-NXX of the directory number alone is insufficient for routing of communications directed thereto. Such a subscriber may be referred to as a "ported subscriber." Each entry preferably includes directory assistance information such as the name of the subscriber, directory number of the subscriber, etc. Reference is made to FIG. 2 which illustrates an exemplary entry 44 including blocks 46, 48, 50, 52, 54, 56 and 58 corresponding to types of information that may be stored in connection with entry 44. In particular, entry 44 preferably includes the following information: the directory number of the subscriber which is also referred to as the "dialed DN" or "dialed directory number" 46; the ported directory number 48; the name of the subscriber 50; the locality of the subscriber 52; the address of the subscriber 54; a service provider identifier 56; and possibly other information 58. The careful reader will note that certain types of information are common to an entry 30 in the directory assistance database 24 and to an entry 44 in the local number portability database 26. Common types of information include: name; locality; address; and service provider identifier.

Preferred Operation of the Present Invention

As noted generally above, these two databases, the directory assistance database 24 and the DA-LNP database 26, are used to obtain directory assistance information with respect to the request of a calling party for the directory number of a party. In particular, the operator 22 preferably concurrently initiates a query through OPSS 15 to each of the two databases 24, 26 and includes the name and/or locality information with the query. A query is received at each of the databases 24, 26. In response to receipt thereof, each database 24, 26 conducts a search of its entries for an entry that matches the name and/or locality information that was provided in the query. Each database 24, 26 then provides a response to the received query in the form of the search results. This search may result in the null set, i.e., no matching entry, or may result in one or more matching entries. Each of the search results from the respective databases 24, 26 is provided to OPSS 15.

At the OPSS 15, the two sets of search results are consolidated into consolidated search results by the deletion of any duplicate entries between the two sets of search results. For example, a search of the directory assistance database 24 may turn up search results that include six entries with each such entry being associated with a subscriber named "John Doe". A search of the DA-LNP database 26 may turn up search results that include three entries with each such entry being associated with a subscriber named "John Doe". A comparison of these respective search results finds that two of the "John Doe" entries are common to both sets of search results. Thus, these two sets of search results are consolidated into consolidated search results so that the common "John Doe" entries appear only once in the consolidated search results. The consolidated search results are then provided to the appropriate computer terminal 20 for presentation on the display 21. The directory assistance operator 22 uses the consolidated search results on the display 21 to provide directory assistance information to the calling party. For example, referring to FIG. 2, the consolidated search results may be presented on the display 21 of the computer terminal 20 in the form of a table 60 having columns and rows. The table 60 may include columns for the inclusion of specified information such as a name column 62, an address column 64, a service provider identifier column 66, and a directory number column 68. The table 60 may include rows for the inclusion of specified information with respect to a particular subscriber derived from the consolidated search results. Thus, the table 60 may include a row for each of the four "John Doe" entries in the consolidated search results, to-wit: a row 70 for J. Doe "A"; a row 72 for J. Doe "B"; a row 74 for J. Doe "C"; and a row 76 for J. Doe "D".

Advantageously, the operator 22 may review the table 60 and provide the calling party with directory assistance information related to the calling party's request for the directory number of a party. For example, if the calling party requested the directory number of a party named John Doe "A", then the operator 22 may provide the calling party with directory number of John Doe "A" as it appears on the table 60 on the display 21. As another example, a calling party may have requested the directory number of a party named John Doe "B". From the table 60 and the information in row 72, the operator 22 sees that information as to the directory number of John Doe "B" is unavailable, but that information as to the service provider identifier of John Doe "B" is available. This service provider identifier of John Doe "B" may prompt the operator 22 to route the communication to the appropriate service provider for further servicing of the calling party. Alternatively, the operator 22 may provide the calling party with directory assistance information with regard to John Doe "B" that includes the service provider identifier or other information. As another alternative, the service provider identifier may be used as the basis for providing an announcement or other treatment.

Flow Chart Illustrating Preferred Method

FIG. 3 is a flow chart illustrating the steps of a preferred method of the present invention. The flow chart of FIG. 3 begins in step 80 with the start step and proceeds to step 82 when a directory assistance request is received. After receipt of the directory assistance request at step, 82, the locality and name associated with the directory assistance request are obtained at step 84. Typically, the locality and name information are obtained from the calling party who initiated the request. After the step of obtaining the locality and name, two searches are preferably concurrently performed. The first search, at step 86, is a search of the directory assistance database. The second search, at step 88, is a search of the DA-LNP database. After completion of the two searches, the search results are consolidated at step 90, displayed as consolidated search results at step 92 and the preferred method ends at step 94.

Advantageously, the present invention provides a system and method for providing directory assistance information. In particular, the preferred embodiment provides directory assistance services in such a manner that the service provider may provide the requested directory number, or the service provider may route the call to the appropriate service provider for the provision of the requested directory number. Alternatively, the calling party may be provided with other information related to the requests for the directory number of a party.

While this invention has been described in detail with particular reference to the preferred embodiment thereof, it will be understood that variations, modifications and alternate embodiments can be effected within the spirit and scope of the invention as described hereinabove and as defined in the appended claims.

We claim:

1. A telecommunications system for providing directory assistance service, comprising:

an operator services system (OPSS) functionally connected to a first database and to a second database;

said first database including one or more first database entries with each first database entry further comprising a name;

said second database including one or more second database entries with each second database entry further comprising a name;

said OPSS being operative to receive a request from a calling party for a directory number associated with the name of a called party that said calling party desires to call, in response to said request, said OPSS being further operative to make a first query of said first database for first search results relating to said name of said called party, and to make a second query of said second database for second search results relating to said name of said called party;

in response to said first query from said OPSS, said first database being operative to search said one or more first database entries for said name of said called party and to provide said first search results to said OPSS;

in response to said second query from said OPSS, said second database being operative to search said one or more second database entries for said name of said called party and to provide said second search results to said OPSS;

said OPSS being further operative to receive said first search results and said second search results, to consolidate said first search results and said second search results into consolidated search results, and to provide said consolidated search results to a display; and said display being operative to display said consolidated search results, whereby said consolidated search results are used to provide said directory assistance service in response to said request for said directory number associated with said name of said called party.

2. The system of claim 1, wherein said OPSS is further operative to consolidate said first search results and said second search results into said consolidated search results by eliminating any duplicative entry between said first search results and said second search results.

3. The system of claim 1, wherein said first database further comprises a directory assistance database.

4. The system of claim 1, wherein said second database further comprises a directory assistance-local number portability database.

5. The system of claim 4, wherein said second search results further comprise an entry corresponding to said name of said called party, said entry including a service provider identification.

6. A telecommunications system for providing directory assistance service, comprising:

an operator services system (OPSS) functionally connected to a first database and to a second database;

said first database including one or more first database entries with each first database entry further comprising a name;

said second database including one or more second database entries with each second database entry further comprising a name;

said OPSS being operative to receive a request from a calling party for a directory number associated with the name of a called party that said calling party desires to call, in response to said request, said OPSS being further operative to concurrently make a first query of said first database for first search results relating to said name of said called party and a second query of said second database for second search results relating to said name of said called party;

in response to said first query from said OPSS, said first database being operative to search said one or more first database entries for said name of said called party and to provide said first search results to said OPSS;

in response to said second query from said OPSS, said second database being operative to search said one or more second database entries for said name of said called party and to provide said second search results to said OPSS;

said OPSS being further operative to receive said first search results and said second search results, to consolidate said first search results and said second search results into consolidated search results, and to provide said consolidated search results to a display; and said display being operative to display said consolidated search results, whereby said consolidated search results comprise a basis for providing said directory assistance service in response to said request for said directory number associated with said name of said called party.

7. A telecommunications system for providing directory assistance information to a calling party who has requested a directory number of a called party, comprising:

a directory assistance-local number portability (DA-LNP) database including one or more entries with each entry further comprising directory assistance information;

an operator services system (OPSS), said OPSS being operative to receive a request from said calling party for said directory number of said called party, said directory number representing one that said calling party desires to call, in geographic areas where there exist multiple competitive telecommunication service providers, and to make a query of said DA-LNP database with respect to said request based on the name of said called party;

in response to said query from said OPSS, said DA-LNP database being operative to check said one or more entries for a matching entry to said called party based on said name of said called party, and if said matching entry is found, to provide said OPSS with the directory assistance information corresponding to said matching entry; and said OPSS being further operative to receive said directory assistance information corresponding to said matching entry from said DA-LNP database.

8. The system of claim 7, wherein said directory assistance information corresponding to said matching entry further comprises a service provider identification corresponding to said name of said called party.

9. The system of claim 7, further comprising a display;

wherein said OPSS is further operative to provide said directory assistance information corresponding to said matching entry to said display; and wherein said display is operative to receive said directory assistance information corresponding to said matching entry from said OPSS and to display said directory assistance information corresponding to said matching entry.

10. In a telecommunications system, a method for providing directory assistance service, comprising the steps of:

a. receiving a request from a calling party for a directory number associated with the name of a called party that said calling party desires to call;

b. in response to said request,
using said name and searching a first database for first search results relating to said name of said called party, and
using said name and searching a second database for second search results, wherein said first search results and said second results both relate to said name of said called party;

c. consolidating said first search results and said second search results into consolidated search results; and d. displaying said consolidated search results, whereby said consolidated search results comprise a basis for providing said directory assistance service in response to said request for said directory number associated with said name of said called party.

11. The method of claim 10, wherein said step of consolidating said first search results and said second search results into said consolidated search results further comprises eliminating any duplicative entry between said first search results and said second search results.

12. The method of claim 10, wherein said second search results comprise a service provider identification relating to said name of said called party, and wherein said step b further comprises searching said second database for said service provider identification.

13. In a telecommunications system, a method for providing directory assistance service, comprising the steps of:

a. receiving a request from a calling party for a directory number associated with the name of a called party that said calling party desires to call;

b. in response to said request,
using said name and searching a first database for first search results relating to said name of said called party, and
using said name and searching a second database for second search results, wherein said first search results and said second results both relate to said name of said called party;

c. consolidating said first search results and said second search results into consolidated search results;

d. displaying said consolidated search results; and e. providing said calling party with said directory assistance service based on said consolidated search results.

14. In a telecommunications system, a method for providing directory assistance service, comprising the steps of:

a. receiving a request from a calling party for a directory number associated with the name of a called party that said calling party desires to call;

b. in response to said request, using said name and concurrently searching a first database for first search results relating to said name of said called party and a second database for second search results, wherein said first search results and said second results both relate to said name of said called party;

c. consolidating said first search results and said second search results into consolidated search results; and    d. displaying said consolidated search results, whereby said consolidated search results comprise a basis for providing said directory assistance service in response to said request for said directory number associated with said name of said called party.

15. In a telecommunications system, a method for providing directory assistance information to a calling party who has requested the directory number of a called party that said calling party desires to call, comprising the steps of:

providing a directory assistance-local number portability (DA-LNP) database including one or more entries with each entry comprising a name of a subscriber and a service provider identification;

using a name of said called party and searching said DA-LNP database for a matching entry comprising a subscriber name that matches said name of said called party to determine a service provider identification relating to said name of said called party; and    using said service provider identification relating to said name of said called party to provide said directory assistance information.

16. In a telecommunications system including a plurality of directory assistance-local number portability (DA-LNP) databases and a plurality of directory assistance databases, a method for providing directory assistance service to a calling party who has requested the directory number associated with the name of a called party that said calling party desires to call, comprising the steps of:

causing each of said plurality of DA-LNP databases to include one or more entries with each entry comprising a name of a subscriber and a service provider identification;

based on said name of said called party provided by said calling party, concurrently searching said plurality of DA-LNP databases and said plurality of directory assistance databases for a matching entry comprising a subscriber name that matches said name of said called party;

if there is more than one matching entry as a result of concurrently searching said plurality of DA-LNP databases and said plurality of directory assistance databases, then eliminating any duplicative entry from said more than one matching entry so as to provide consolidated search results; and    using said consolidated search results to provide said directory assistance service to said calling party.

\* \* \* \* \*